United States Patent [19]

Grote

[11] 4,015,959
[45] Apr. 5, 1977

[54] IN-LINE FILTER FOR GASES

[75] Inventor: George A. Grote, Glen Rock, Pa.

[73] Assignee: Beach Precision Parts Co., Glen Rock, Pa.

[22] Filed: Sept. 12, 1975

[21] Appl. No.: 613,043

[52] U.S. Cl. .................................. 55/274; 55/316; 55/318; 55/486; 55/494; 55/515; 55/518; 55/525; 55/DIG. 17

[51] Int. Cl.² .................... B01D 29/04; B01D 29/08

[58] Field of Search .............. 55/97, 274, 316, 318, 55/387, 432, 480, 482, 486, 487, 494, 503, 505, 515, 518, DIG. 17, 525

[56] References Cited

UNITED STATES PATENTS

| 2,521,785 | 9/1950 | Goodloe | 55/97 X |
|---|---|---|---|
| 3,353,339 | 11/1967 | Walter | 55/316 |
| 3,464,186 | 9/1969 | Hankison et al. | 55/387 X |
| 3,505,794 | 4/1970 | Nutter et al. | 55/487 |
| 3,527,027 | 9/1970 | Knight et al. | 55/316 X |
| 3,680,283 | 8/1972 | Jones, Jr. | 55/387 X |
| 3,681,899 | 8/1972 | Grote | 55/515 X |
| 3,705,480 | 12/1972 | Wireman | 55/316 X |
| 3,724,177 | 4/1973 | Grote | 55/316 |
| 3,796,025 | 3/1974 | Kasten | 55/316 |
| 3,832,831 | 9/1974 | Ritchie et al. | 55/316 X |
| 3,890,122 | 6/1975 | Frantz | 55/432 X |

FOREIGN PATENTS OR APPLICATIONS 1,247,430   10/1960   France .................. 55/316

Primary Examiner—Frank W. Lutter
Assistant Examiner—Kathleen J. Prunner
Attorney, Agent, or Firm—C. Hercus Just

[57] ABSTRACT

Apparatus for removing moisture such as oil and water vapor from compressed gases such as air with less decrease in pressure by conventional filter means by providing a relatively coarse annular filter to condense the major portion of such moisture by gases passing downward therethrough to afford drainage of condensate by gravity before the gases pass upward through coaxial interior desiccant filter means to remove any residual moisture before the moisture free gases are discharged from the upper end of the desiccant filter means. The coarse filter is contained between transparent outer and inner containers and the desiccant filter means is contained within the transparent inner container so as to extend upwardly above the upper end of the coarse filter such that the condition of both the coarse filter and desiccant filter means is visually observable.

7 Claims, 7 Drawing Figures

IN-LINE FILTER FOR GASES

BACKGROUND OF THE INVENTION

The present invention pertains primarily to a filter unit particularly adapted to remove moisture such as oil and water vapors contained in gases, such as air, when such gases are compressed by conventional compressors which inherently produce compressed gases which include at least a limited amount of oil and water vapors. Under circumstances where compressed gases such as air which are free from such vapors are required, it is necessary to remove the same by filtering and it is preferred that such filtering occur while the gases are under pressure, particularly where the gases are to be used in circumstances requiring that they have a pre-determined pressure, especially to operate certain instruments or mechanisms in which oil and water vapors cannot be tolerated.

It is possible to filter such compressed gases to remove oil and water vapors therefrom by employing one or a series of cartridges in a suitable container or housing having for example an inlet at one end and an outlet at the other end. Said cartridges contain desiccant material which, because of the relatively compact nature of the material, inherently impede the speed at which the gases can pass through the filtering cartridges. Such operation also is attended by a substantial decrease in pressure at the discharge end of the filter unit.

One example of a filter unit of the type referred to above is disclosed in U.S. Pat. No. 3,681,899, in the name of George A Grote, the instant applicant. Also, the filter shown in said patent is an in-line type of filter and the casing within which the filter cartridge or cartridges are mounted for operation is of separable, two-part construction. In order to separate one part from the other however, to either remove or replace cartridges therein, it is necessary to disconnect the line from the end of the part of the casing which is removed from the other part. Further, in the event more than one cartridge is included in the casing, the gas to be filtered must pass end-to-end through all of said cartridges.

Further, one of the characteristics of said aforementioned U.S. Pat. No. 3,681,899 is that it includes a transparent case which permits inspection of the condition of the cartridge unit therein to determine when replacement thereof is necessary. This is due to the fact that as oil vapor in particular is filtered from the gases by said unit, it progressively becomes darker in color and an experienced operator can determine from visual inspection when such replacement is necessary.

Efforts to improve the speed at which filtering of gases can be undertaken have occurred and one example of this is illustrated in several embodiments in U.S. Pat. No. 3,464,186, in the name of P. M. Hankison et al, dated Sept. 2, 1969. Relatively coarse filter material for condensing oil vapor, for example, is used in a vertical arrangement wherein desiccant type filter means is mounted above said coarse filter material for purposes of removing water vapor from the gases, the filtered gas discharging from the upper end of said vertical arrangement. Porous foam discs are disposed at opposite ends of said desiccant filter means and this entire arrangement imposes a distinct retarding effect on the speed at which gases pass through the entire assembly incident to being filtered.

Another embodiment of said Hankison et al patent discloses a coaxial arrangement of the coarse steel wire mesh filter which is disposed around the inner desiccant type filter, these filtering means being inclosed within non-transparent metallic tubular members. The direction of gases is such that they enter the lower end of the outer housing, passing upwardly through the coarse filter material to condense oil from the gases, the gases then extending upwardly and then being inverted to pass downwardly through the interior desiccant type filter means, the filtered gases discharging from the bottom of the unit. In order to clear the unit of accumulated condensate however, certain regeneration operations are required and, as in regard to the previously described embodiment of said patent, porous foam discs extend across opposite ends of the desiccant type filter means, whereby speed of operation of the filtering process and also minimizing reduction in the pressure of the filtered gases do not appear to be objectives of the patent. Further, if condensate is to drain by gravity from the coarse filter, it must flow downwardly in a manner to further saturate rising gases to be filtered.

SUMMARY OF THE INVENTION

It is the principal object of the present invention to provide a filter unit and a process for filtering moisture such as oil and water vapors from compressed gases such as air with a minimum of impedance to the passage of the gases through the filter unit in accordance with the proposed process and also to minimize the reduction of pressure in the gases between the inlet and discharge of the same incident to being filtered. This objective primarily is achieved by using coaxial relatively coarse outer filter means contained within a transparent outer container and surrounding a transparent inner container within which finer, desiccant type filter material extends between opposite ends thereof and upwardly at a level above the upper end of the coarse outer filter means, whereby the condition of the inner, desiccant type filter means readily is observable visually through the space above the outer coarse filter means.

It is another object of the invention to provide a space in the lower portion of the outer, cup-shaped container below the lower ends of both the relatively coarse, moisturecondensing means and the inner, desiccant type filter means for the dual purpose of providing passage for the partially filtered gases for movement between the lower ends of the outer, relatively coarse filter member and the lower end of the inner, desiccant type filter means, and also provide a chamber into which condensates which have been condensed by the relatively coarse filter means progressively remove by gravity and thereby minimize impedance to the passage of gases through said relatively coarse filter means incident to said gases being transferred to the inner, desiccant type filter means for movement upwardly therethrough. As a further objective, the condensate is very simply removed from the chamber at the lower end of the outer container by opening a valve, such as a pet cock.

It is a further object of the invention to provide a perforated disc extending across the lower ends of both the coarse and desiccant type filters and another perforated disc extending across the upper end of the desiccant type filter only, said disc having a substantial number of openings of reasonable size therethrough and thus serve as positioning means for said filter means as well as offering substantially no impedance to the passage of the gases through said filters.

Still another object of the invention is to provide a head in which both the inlet and outlet port are provided with barrier means between to prevent direct communication therebetween, whereby the line may be permanently connected to said ports, while the unit is fully capable of having either or both of the filter means removed and replaced without disconnecting the line from said head due to the fact that the upper end of the tranparent, cup-shaped outer container is threadably connected within the lower end of a cavity in the bottom of the head, said head also including a seat for the upper end of the cylindrical inner container in which the desiccant type filter is disposed, and seal means are provided between the upper ends of both the inner and outer containers with respect to said head in order to prevent the passage of gases or fluids between said upper ends of the containers and said head.

One further object of the invention is to provide very simple means in the lower portion of the cup-shaped outer container in the form of short, radially extending ribs, the upper surfaces of which are within a common transverse plane within which the aforementioned lower perforated disc is disposed for support upon the upper surfaces of said ribs, said ribs being within the compartment in the lower end of said outer container in which the condensate accumulates.

A still further object of the invention is to provide a process for removing fluids from gases by first effecting condensation of the majority of the fluids, which primarily initially exist as vapors, by passing the moisture-laden gases through a coarse, porous metallic filter in a downward direction, whereby the condensate formed by such passage through the filter moves downward by gravity and is drained from said filter, thereby minimizing impedance of the passage of the gases through said filter on their way to passage through a desiccant type filter in an upward direction for purposes of absorbing any residual moisture from said gases before being discharged from the upper end of said filter and, due to only a very small percentage of fluid remaining in said gases for purposes of being absorbed by the latter filter, the useful life of the filters not only in extended but the relative freedom from accumulated, absorbed fluids or moisture within the latter filter further minimizes the decrease in speed of the gases passing through the entire filter unit as well as minimizing the lowering of pressure of the discharging gases as compared with the pressure of the gases as introduced to the filter unit.

Details of the foregoing objects and of the invention, as well as other objects thereof, are set forth in the following specification and illustrated in the accompanying drawings comprising a part thereof.

DETAILED DESCRIPTION

Figure 1:
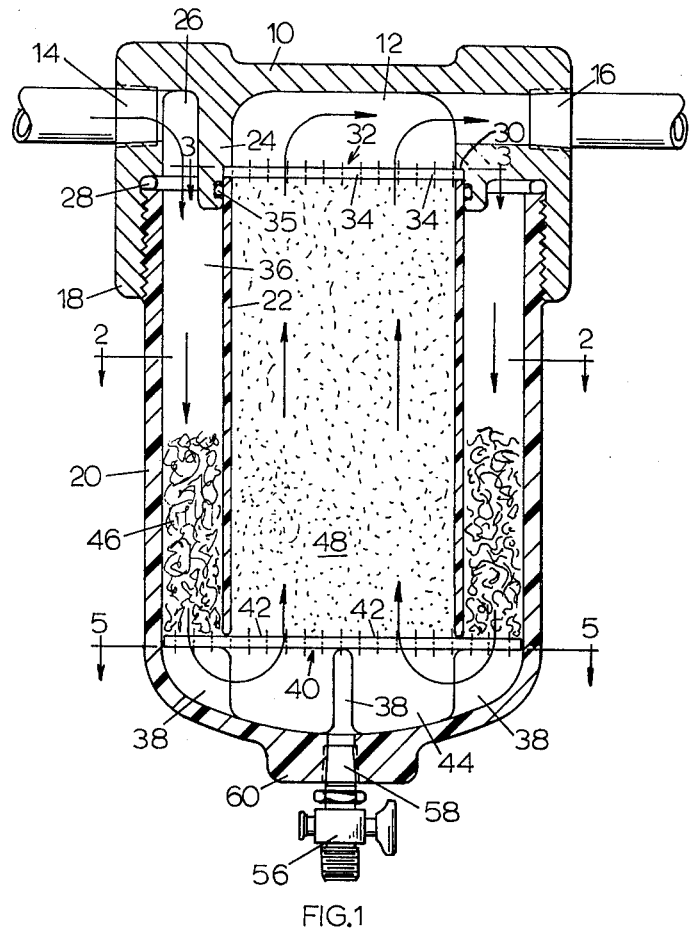
FIG. 1 is a vertical sectional elevation of a two stage filter unit embodying the principles of the present invention.
Figure 2:
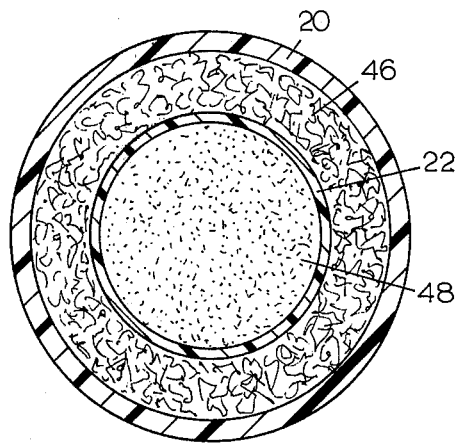
FIG. 2 is a transverse sectional view of the filter unit shown in FIG. 1 as seen on the line 2—2 thereof.

As indicated above, the principle object of the present invention is to provide a relatively simple, in-line filter which is light in weight and is a two-stage type for purposes of (1) providing minimum impedance to the flow of gas through the filter unit and (2) cause a minimum of decrease in pressure in the gases between the inlet and discharge ports of the filter unit. In addition, particularly for compactness and minimum overall size, the respective stages of the filter comprise an outer relatively coarse filter element which is annular, within a transparent outer container, extending upward from the lower end thereof to a level substantially midway of the overall length, and surrounding a cylindrical inner container which also is transparent and contains a desiccant type filter cartridge which extends substantially between the opposite ends of the filter unit and, due to the fact that substantially the upper half of said inner filter unit is visible through both the inner and outer containers, the condition thereof readily can be determined simply by visual inspection without requiring disassembly of the containers for purposes of replacing the innermost cartridge.

A further major objective of the invention is to achieve minimum reduction in pressure and speed by means of the outer, relatively coarse filter medium serving essentially as a condenser to reduce moisture vapor, both oil and water, for example, which are within the gases being filtered, such as air, said gases passing downwardly through said relatively coarse outer filter member in order that the droplets of condensed vapor readily may discharge by gravity from the lower end of said coarse filter unit for containment within a space specifically provided in the lower portion of the outer container to receive such condensate, said space also providing passage means for the transmission of partially filtered gases, from which the major portion of the liquid vapors have been removed by condensation effected by said relatively coarse outer filter, said gases then passing upwardly through the desiccant type filter which primarily is for purposes of absorbing from the gases any residual vapors, which from practical experience have been found to comprise mainly a very small percentage of water vapor, said completely filtered gases then discharging from the upper end of said inner filter unit.

Still another objective of the invention and convenience afforded thereby is the fact that the unit comprises a head which is connected in-line between, for example, an air compressor and a storage tank or discharge conduit, and said aforementioned outer container being connected to the head by means of threads on the upper end of said container which are co-engageable with complementary threads on the inner wall of a cavity extending upward from the lower end of said head. When said outer container is secured in operative position relative to the head, it automatically maintains the inner container in operative relationship concentrically within the outer container and the lower end thereof being spaced from the bottom portion of the outer container in order to provide said aforementioned space within which condensate accumulates prior to being drained from said space periodically.

Referring to the drawings and especially FIGS. 1, it will be seen that the head 10 preferably comprises a metal casting within which a cavity 12 is formed. Said head includes an inlet port 14 and a discharge port 16 which respectively are connected to the line conduit. As a practical matter, shutoff valves preferably are mounted in said line immediately adjacent said inlet and discharge ports in order that the flow to and through the head may be discontinued at times when the filter is being serviced. The lower portion of the cavity 12 is defined by an annular skirt 18 on the lower end of head 10, the same having internal threads which are complementary to the external thread on the upper end of transparent outer container 20. Said container may be formed from suitable transparent synthetic resin which is relatively free from attack by the majority of industrial vapors. One suitable commercial resin is sold under the trade name LEXAN, manufactured by the General Electric Co. identified as number 14-111. Such resin is merely exemplary however of a number of other industrial resins which are suitable for use in making both the outer container 20 and the transparent tubular inner container 22. The head 10 also is provided with an inner skirt 24 which is shorter than the outer skirt 18 and in conjunction with outer skirt 18 defines a partially annular upper space 26 which communicates only with the inlet port 14 and not the discharge port 16. The inner skirt 24 however surrounds a portion of the upper cavity 12 which communicates only with the discharge port 16. Therefore, the head does not provide straight-through passage between the inlet and discharge ports 14 and 16.

Figure 3:
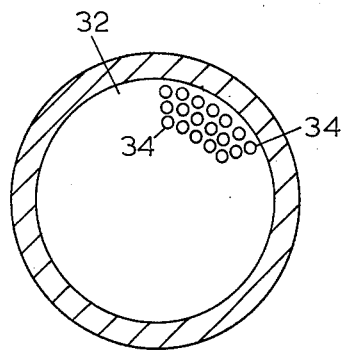
FIG. 3 is a transverse sectional view of the unit shown in FIG. 1 as seen on the line 3—3 thereof.

The threaded upper end of the outer container 20, when connected to the threads of annular skirt 18 of head 10 engages a sealing O-ring 28 to prevent escape of gases and vapor between said head and outer container. Also, the inner skirt 24 is provided with an annular seat 30 within which is seated uppermost a perforated disc 32 which, for example, may be formed from stainless steel and a large number of holes 34 are formed therein as shown in an exemplary manner in FIG. 3 for example so as not to offer any substantial impedance to the passage of gases therethrough. Other suitable material which preferably is not attacked by the majority of industrial vapors may be used to form the disc 32. Abutting the lower surface of disc 32 is the upper end of the transparent inner container 22 which also is engaged by a sealing O-ring 35 to prevent the escape of gases from the upper end of inner container 22 into the annular space 36 which is formed between the outer and inner containers 20 and 22, due to the different diameters thereof.

Figure 5:
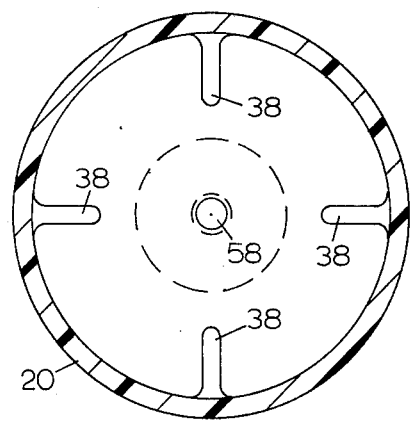
FIG. 5 is a further transverse sectional view of the unit shown in FIG. 1 as seen on the line 5—5 thereof.

The lower portion of outer container 20 also is provided with a plurality of radially, inwardly extending, relatively short ribs 38, the number and arrangement of which are illustrated in plan view in FIG. 5. The upper edges of the ribs 38 are all within a common transverse plane and co-operatively support a lower perforated disc 40 which is extensively perforated with a number of holes 42 which are similar to the holes 34 in upper disc 32 and correspondingly offer very free passage of gases therethrough without substantial impedance. When the outer container 20 is threaded operatively into sealing engagement with the head 10, the lower disc 40 abuts the lower end of inner container 22 and forces the upper end thereof clampingly against the upper disc 32.

Figure 4:
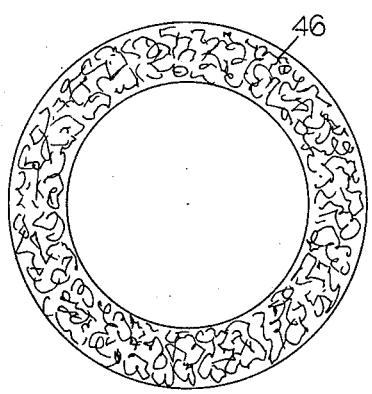
FIG. 4 is a top plan view of the coarse filter element included in the filter unit shown in FIG. 1, substantially as seen upon the line 2—2 of said figure.
Figure 6:
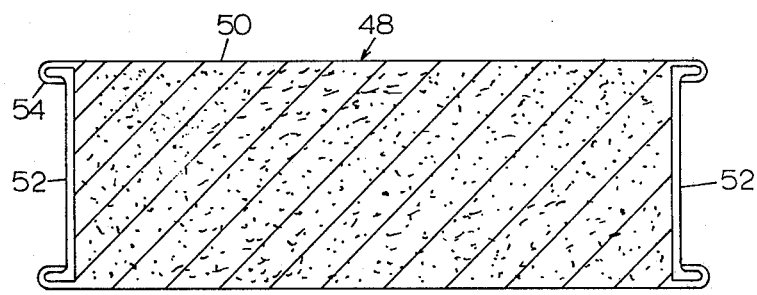
FIG. 6 is a longitudinally sectioned view of a typical desiccant type filter cartridge of the type utilized in the inner container of the filter unit shown in FIG. 1.

In addition to the seating provided by the ribs 38 for the lower disc 40, the vertical dimension thereof provides a lower compartment 44 which serves as an accumulating receptacle for condensate comprising condensed vapors removed from the incoming gases which move downwardly from the inlet port 14, as shown by the directional arrows, into contact with the upper end of an annular relatively coarse filter unit 46 which preferably comprises a pre-formed annulus of coarse stainless steel wool having substantially uniform thickness and height. While it is not restricted thereto, said wool is of the type from which certain types of domestic kitchen scouring pads are formed. Said relatively coarse filter 46 is annular, as shown in plan view in FIG. 4 and preferably tightly fills the lower portion of the annular space 36 between the outer and inner containers 20 and 22. Preferably, the axial length of the coarse filter unit 46 is approximately one half that of the inner container 22, whereby substantially the upper half of the annular space 36 is unoccupied except for gases passing downwardly therethrough for engagement with the filter unit 46 which serves to condense the very substantial major portion of the vapors, both oil and water for example, Due to the fact that the gases pass downwardly through said coarse filter unit 46, the condensate freely passes by gravity through the ample spaces in the coarse filter unit and falls as droplets by gravity into the lower accumulating compartment 44. Said compartment also provides passage means between the lower end of the relatively coarse filter 46 and the lower end of inner filter unit 48 which preferably is in the form of a cartridge composed of desiccant type filter material enclosed within a porous textile type enclosure 50. The enclosure 50 preferably is tubular and is very slightly larger in diameter then the inner surface of the inner container 22, whereby when the cartridge 48 is inserted therein, it relatively tightly engages the inner surface of the inner container 22 and thereby prevents the escape of unfiltered gas between the inner walls of inner container 22 and the enclosure 50 of the cartridge 48. The enclosure 50 also has end discs 52 of the same material from which the enclosure 50 is formed and the ends of the enclosure 50, as shown in FIG. 6, preferably are inwardly turned at 54 to overlap the outwardly extended peripheral edges of the discs 52, to which they are suitably stitched. One suitable type of material from which the enclosure 50 and end discs 52 may be formed is sold under the trademark NYLON, but other equivalent textile fabrics may be used. Also, the desiccant type filter material within the cartridge filter unit 48 is pulverulent in nature and the same may comprise, for example, diatomaceous earth or fuller's earth, or other equivalent filter material. The mesh of the textile material which encloses said pulverulent filter material is relatively fine and therefore prevents any of the filter material from being entrained within the gases exiting from the upper end of the filter unit 48.

Due to the fact that the relatively coarse filter unit 48 removes by condensation the vast majority of the liquid vapors normally occurring in gases, such as air, of the type principally intended to be freed of such vapor, the useful life of the inner filter unit 48 is greatly extended over that which is experienced by similar cartridges mounted in filter units of a single stage type, such as in the applicant's prior Pat. No. 3,681,899. In the filter covered by said patent, the filter cartridge supported within the housing 10 is the sole filtering means and thus, by being required to remove by absorption all of the contained moisture or fluid vapors within the gases being filtered, such cartridge will become relatively saturated with such absorbed vapors far more rapidly than the inner filter unit 48 of the instant invention. Accordingly, not only is the life of the inner filter unit 48 much more extensive than when the same, for example, is used in a single stage filter such as in said prior patent, but in addition, the very slow accumulation of absorbed vapors within the cartridge 48 renders the passage of gases therethrough with a minimum of impedance for long periods of time. Further, when the cartridge 48 has absorbed its normal intended quota of vapors, the color of the filter is changed, such as by becoming substantially darker then the initial color thereof, and this condition is readily observed visually through the transparent walls of both the outer and inner containers 20 and 22 above the upper end of coarse filter 46.

Also in view of the transparent nature of the outer container 20, the accumulation of condensate in the lower compartment 44 is readily observable and it will be noted that a discharge valve 56 is threadably connected within a lower discharge port 58 provided for example in a reinforcing boss 60 molded on the lower end of the outer container 20. The ribs 38 also provide reinforcing means for the lower end of the outer container 20.

Figure 7:
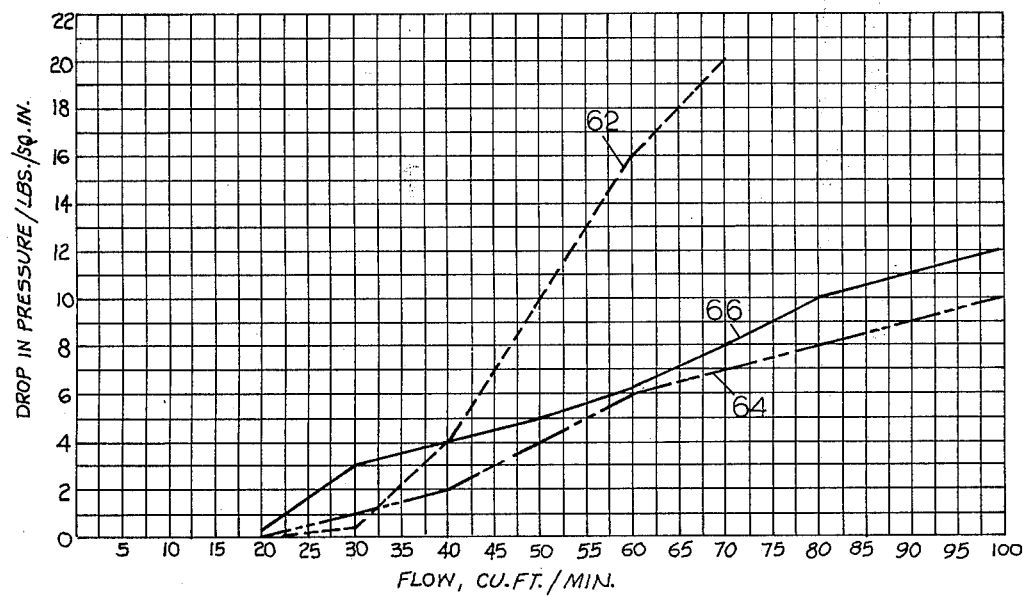
FIG. 7 is an exemplary chart providing a comparison of respective decreases in pressure in pounds per square inch versus standard cubic feet of gas per minute which result from use of one of the conventional types of filter units and a filter unit embodying the present invention respectively when using a single desiccant type filter cartridge and two of such cartridges arranged in a longer embodiment of filter unit having an inner container of a length to accommodate two such cartridges.

From the foregoing, it will be seen that the direction of gases passing from the inlet port 14 downwardly through annular space 36 and then through the relatively coarse filter unit 46 causes effective condensation of the majority of vapors which move downward by gravity as droplets for accumulation within and ultimately discharge from the lower compartment 44, the gases then moving upwardly through the amply perforated disc 40 through the desiccant type filter cartridge unit 48 and then through the equally amply perforated upper disc 32 for exit through the discharge port 16, all as indicated by the various directional arrows shown especially in FIG. 1. This results in much greater filtering speed as well as much less decrease in pressure between the inlet and discharge port as compared with applicant's aforementioned patent. This comparison is made evident, for example, by the chart shown in FIG. 7 in which the ordinates comprise the drop in pressure in pounds per square inch and the abscissa comprises the flow in standard cubic feet per minute. A typical operational graph shown by dotted line 62 reflects the drop in pressure as the volume in gas increases. In contrast, dot and dash graph line 64 represents the much lower drop in pressure of the unit illustrated in FIG. 1 of the present application in which only a single inner desiccant type filter cartridge 48 is employed. If desired, it is possible to increase the overall length of the filter unit of the present invention sufficient to accommodate a pair of the inner desiccant type filter cartridges 48 in end-to-end relationship but in which only a single outer relatively coarse filter unit 46 is employed. Under such circumstances, the graph line 66 represents the drop in pressure when employing such double inner filter unit as the volume is increased. As would be expected, the drop in pressure is slightly greater in the latter circumstance then when only a single inner filter unit or cartridge 48 is employed as represented by the graph line 64.

Servicing the unit is accomplished most easily and readily by simply unscrewing the outer container 20 without disturbing the connection of the head 10 with the line in which it is mounted. The outer container 20 brings with it the inner container 22 and the respective filter units 46 and 48. The O-rings 28 and 35 remain within their annular seat under such circumstances so that it is not necessary to re-fit them when restoring the inner and outer containers to their operative position within the head 10. Such servicing is only required when the inner cartridge unit 48 is to be replaced as determined by visual inspection through the transparent co-axial inner and outer housings 20 and 22 as explained above. When the inner cartridge 48 is saturated a predetermined amount as determined by the eye of an experienced operator, such saturated cartridge is discarded and a new one is mounted within the inner container 22 in place thereof. The coarse outer filter 46 may be washed in suitable detergent and hot water, for example, or any other cleansing solution capable of removing in particular oil condensate accumulating within the filter unit. Such washing may be resorted to for as much as two or three or even more times before replacement thereof is required, such washing occurring each time it is necessary to replace the inner filter cartridge 48. Finally however, the coarse filter unit 46 becomes contaminated to such an extent even after a number of washings, that is is necessary to discard the same and replace it with a new one. The foregoing explanation however is intended primarily to be illustrative rather then restrictive. Further, such servicing is accomplished without requiring any tools and the same may be accomplished in a matter of five to ten minutes, as compared with twenty five to thirty five minutes being required to service existing filter units employing filter cartridges and in which it is necessary to disconnect at least part of the filter unit from the line in which it is connected.

Also as indicated above, the entire unit is light in weight. By way of example and not restriction, a filter in which only a single inner filter cartridge 48 is employed will weight approximately 7.75 lbs., in which the head 10 is cast from aluminium and said unit is capable of handling from 0 to 45 standard cubic feet per minute. Where a double inner filter cartridge 48 is employed, the unit will weight approximately 10 lbs. and is capable of handling from 0 to 100 standard cubic feet per minute. Existing filter units now available on the market, for similar flow rates, are respectively heavy.

While the invention has been described and illustrated in its several preferred embodiments, it should be understood that the invention is not to be limited to the precise details herein illustrated and described since the same may be carried out in other ways falling within the scope of the invention as illustrated and described.

I claim:

1. An in-line gas filter unit comprising in combination, a head defining a cavity having an inlet port for gases to be filtered and a discharge port for outlet of filtered gases, barrier means in said head between said ports, an outer transparent cup-shaped container having means on the open end separably connectable to said head for communication with only said inlet port, said container depending from said head and having a plurality of circumferentially spaced relatively short radial ribs extending uniform distances upwardly from the lower end of said container, an open-ended transparent inner tubular container of lesser diameter than said outer container positioned coaxially therein to provide an annular filter space therebetween, said head having an annular seat and the upper end of said inner container being received within said seat for communication only with said discharge port in said head and the lower end being axially spaced from the bottom of said outer container, sealing means in said seat engaging said upper end of said inner container, relative coarse filter material filling said annular space between said lower end of said inner container and an intermediate position between the ends of said inner container, thereby rendering the portion of said inner container between said upper end thereof and said coarse filter material visible through said outer container, an additional filter cartridge of desiccant filter material contained in a porous enclosure positioned within said inner container and extending substantially between the opposite ends thereof and in tight engagement with the inner surface thereof to insure passage of gases through said desiccant material for additional filtering thereby, upper and lower perforated rigid discs positioned respectively flatly across the opposite ends of said inner container and the perforations therein being sufficiently large to permit ready passage of gases therethrough without impeding the movement of said gases as the same pass to and from said desiccant filter material of said additional filter cartridge, the lower perforated rigid disc being supported upon said radial ribs and commonly supporting the lower ends of said coarse filter material and said additional filter cartridge, whereby the condition of said desiccant filter material is visible through said outer container and said upper portion of said inner container to indicate the need to replace said additional filter when necessary and gases pass downwardly through said coarse filter material and upwardly through said desiccant filter material in passage to said discharge port free of contaminating moisture and vapor.

2. The filter unit according to claim 1 in which said coarse filter material is porous metal wool resistant to corrosion by oil and water.

3. The filter unit according to claim 2 further including a space in the lower part of said outer container below said coarse filter material and arranged to receive fluid condensate therefrom as separated from said gases.

4. The filter unit according to claim 3 in which said porous enclosure for said desiccant filter material in said additional filter comprises a pervious container of textile material disposed tightly against the inner surface of said inner container to prevent the passage of gases therebetween.

5. The filter unit according to claim 1 in which said cavity in said head extends upwardly from the lower end of said head and the upper end of said cup-shaped container and said cavity having complementary threads respectively therein to connect said container to said head in operative relationship therewith and support said container in downwardly extending direction from said head, said unit further including sealing means between said head and said open upper end of said container.

6. The filter unit according to claim 5 in which said lower perforated disc is spaced by said radial ribs from the bottom of said cup-shaped container to provide passage means for gases and also a space adapted to receive and accumulate condensate removed from said gases by said relatively coarse filter material, and the abutting of said lower perforated disc against the lower end of said inner container positions the upper end of the same in said seat in said head when said outer container is connected operatively to said head.

7. The filter unit according to claim 1 in which said coarse filter material is stainless steel wool packed into said annular space and comprising an annulus of substantially uniform thickness and height within said space between said outer and inner containers.

* * * * *